(12) United States Patent
Li et al.

(10) Patent No.: US 7,462,836 B2
(45) Date of Patent: Dec. 9, 2008

(54) METHOD AND SYSTEM TO SEPARATE AND MEASURE $^{37}$AR QUICKLY

(75) Inventors: Wei Li, Sichuan (CN); Hongxia Wang, Sichuan (CN); Rongliang Duan, Sichuan (CN); Zhishang Bian, Sichuan (CN); Yongchun Xiang, Sichuan (CN); Meiying He, Sichuan (CN); Jian Gong, Sichuan (CN)

(73) Assignee: Institute of Nuclear Physics and Chemistry, China Academy of Engineering Physics (CN)

( * ) Notice: Subject to any disclaimer, the term of this patent is extended or adjusted under 35 U.S.C. 154(b) by 37 days.

(21) Appl. No.: 10/583,579

(22) PCT Filed: Dec. 20, 2004

(86) PCT No.: PCT/CN2004/001470

§ 371 (c)(1),
(2), (4) Date: May 22, 2007

(87) PCT Pub. No.: WO2005/059593

PCT Pub. Date: Jun. 30, 2005

(65) Prior Publication Data

US 2008/0028830 A1    Feb. 7, 2008

(30) Foreign Application Priority Data

Dec. 19, 2003    (CN)    .................... 2003 1 0104086

(51) Int. Cl.
  *H01J 47/00*    (2006.01)
(52) U.S. Cl. ........................ 250/380; 250/308
(58) Field of Classification Search ............... 250/380, 250/308
  See application file for complete search history.

(56) References Cited

U.S. PATENT DOCUMENTS

| 3,617,709 | A | * | 11/1971 | Tone .................... 250/379 |
| 4,107,533 | A | * | 8/1978 | Tabuchi et al. .............. 376/245 |
| 4,532,103 | A | * | 7/1985 | Kitaguchi et al. ........... 376/245 |
| 4,783,253 | A |   | 11/1988 | Ayres et al. |
| 2007/0029477 | A1 | * | 2/2007 | Miller et al. ................ 250/290 |

FOREIGN PATENT DOCUMENTS

| CN | 1431488 A | 7/2003 |
| RU | 2085972 C1 | 7/1997 |

* cited by examiner

*Primary Examiner*—Christine Sung
(74) *Attorney, Agent, or Firm*—Wood, Phillips, Katz, Clark & Mortimer

(57) ABSTRACT

The present invention relates to the method and equipment for inspecting nuclear experimental locales, and particularly relates to the method and system for separating and measuring $^{37}$Ar quickly. The method of the invention comprises the steps of sampling, eliminating impurities, separating, purifying, measuring the sum of Ar, collecting Ar, measuring the activity of $^{37}$Ar, etc. The control unit in the system of the invention connects respectively to a sampling unit, a separating-purifying unit, and a radioactivity measuring unit which are connected in turn, and a computer and the software of the control unit are in charge of the automatic operation, measurement and data-collection of the whole system. The method and system for quickly separating and measuring $^{37}$Ar of the patent can meet the requirements of locales inspection for Comprehensive Test Ban Treaty (CTBT), the sensitivity of measuring $^{37}$Ar is high, so do the production and purity of Ar. The system can also be operated on vehicle, which is flexible and has good work efficiency.

25 Claims, 2 Drawing Sheets

METHOD AND SYSTEM TO SEPARATE AND MEASURE $^{37}$AR QUICKLY

1. TECHNICAL FIELD

The present invention relates to the method and equipment for inspecting underground nuclear test locales, and particularly relates to the method and system for separating and measuring $^{37}$Ar quickly. The present invention is suitable for radionuclide inspection of locales for Comprehensive Test Ban Treaty (CTBT).

2. BACKGROUND ART

The inspection of nuclear test locales is one manner of inspection mechanism for CTBT, which includes the technical means such as seismic surveillance, radionuclide detection, sonar and infrasonic detection. In which, radionuclide detection may be the most effective and reliable inspection means at present. The gaseous radionuclides that are detectable within quite a period after nuclear explosion mainly include $^{37}$Ar, $^{131,131m}$Xe, $^{133,133m}$Xe, $^{135}$Xe, $^{85}$Kr, T and etc. Xe has high isotopic activity and detection sensitivity, but with short half-life and short duration for detection. $^{85}$Kr and T have too long half-life, and it is impossible to judge whether they are resulted from a new nuclear test, which thus are not suitable for inspection in country having nuclear source. $^{37}$Ar, as a characteristic neutron activation product resulted from underground nuclear explosion, is featured with moderate half-life, low natural background and etc., which can be effectively detected within a period of 60 days or more after nuclear explosion. $^{37}$Ar gas generated from underground nuclear test leaks upward the ground through soil fissures (cracks), which is diluted and forms a concentration gradient from the underground to the ground. Nevertheless, the content of $^{37}$Ar is still very low in the soil gas, and its radioactivity cannot be detected by directly measuring a soil gas sample in the inspection. Instead, $^{37}$Ar must be firstly separated from the soil gas sample following by purifying and concentrating to obtain a source for measuring radioactivity, and then the radioactivity is measured by using a measuring equipment of nuclear physics. At present, there isn't a set of $^{37}$Ar measuring system suitable for locales inspection in the world. In china, no appropriate method for separating, purifying and measuring $^{37}$Ar from a soil gas and an atmospheric sample has ever been established. A method for measuring low-activity $^{37}$Ar has ever been reported only in Switzerland (Dr. Hugo Loosli, $^{37}$Ar is an Excellent Tool to Detect Subsurface Nuclear Explosions. CTBT/OSI/WS-10/PR/24, 2004.10.20), namely, a method using similar measuring equipment and energy spectrum measuring, wherein the background was reduced to less than 0.1 mBq by means of exterior and interior lead shielding, the measuring time of one sample was a week, and the minimum detection concentration might attain to less than 0.1 mBq/L Ar. However, this method is in need of many conditions that cannot be satisfied in locales inspection.

3. CONTENTS OF THE INVENTION

The object of the present invention is to provide a method for separating and measuring $^{37}$Ar quickly from a soil gas sample or an atmospheric sample, and a system for quickly measuring $^{37}$Ar as a characteristic radioactive product resulted from nuclear explosion by using the method.

The method for separating and measuring $^{37}$Ar quickly from a soil gas sample or an atmospheric sample comprises the following steps in turn:

1) Sampling, which comprises collecting soil gas sample or directly collecting atmospheric air with a syringe sampler;
2) Eliminating impurities, which comprises passing the gas sample as collected through a room temperature molecular sieve column to eliminate $H_2O$ and $CO_2$, and through a room temperature deaerator to eliminate $O_2$;
3) Separating, which comprises allowing the gas sample after eliminating impurities to be adsorbed by entering a sampling column positioned in a cold trap at a temperature from −170° C. to −185° C., and then washing the sampling column with a He gas stream, whereby a majority of Ar and partial $O_2$ and $N_2$ at the front end of the sampling column are carried by the He gas stream to enter a molecular sieve collection column in a liquid nitrogen cold trap;
4) Purifying, which comprises taking the collection column out of the cold trap, and washing it with a He carrier gas stream after heating, whereby Ar, $O_2$ and $N_2$ are detached from the collection column before entering a separation column in a chromatographic system at a temperature from −20° C. to −70° C. for chromatographic separation; allowing the gas after separation to enter a room temperature catalytic deoxidizing column, whereby eliminating trace $O_2$ that is inseparable from Ar and further purifying Ar; then, allowing the gas after purification to be analyzed by entering a thermal conductivity detector;
5) Measuring the sum of Ar, which comprises measuring the sum of Ar as collected with the thermal conductivity detector;
6) Collecting Ar, which comprises collecting Ar in tail gas out of the thermal conductivity detector with an activated carbon collection column positioned in a liquid nitrogen cold trap (i.e., preparative chromatography), heating the activated carbon collection column, and collecting Ar gas as desorbed with a proportional counter;
7) Measuring the activity of $^{37}$Ar, which comprises filling the proportional counter with a working gas methane in a ratio of $Ar/CH_4=9:1$, and measuring the activity of radioactive $^{37}$Ar after thoroughly mixing the two gases.

The system for separating and measuring $^{37}$Ar quickly comprises a sampling unit for sampling the gas to be measured; a separating-purifying unit for separating-purifying-extracting the gas to be measured and for measuring the production of Ar; a measuring unit for measuring the radioactivity of $^{37}$Ar gas as extracted; and a control unit for controlling the working process of the above three units by using a computer and a software. In which, the sampling unit, the separating-purifying unit, and the radioactivity measuring unit are connected in turn, and the control unit, which connects respectively to the sampling unit, the separating-purifying unit, and the radioactivity measuring unit, controls the operation, measurement and data collection of the whole system by using the software and the computer.

The sampling unit comprises a syringe sampler for collecting soil gas, a room temperature molecular sieve dehydration column for eliminating $H_2O$ and $CO_2$, a room temperature deaerator for eliminating $O_2$ from the collected gas, and a sampling column positioned in a low temperature cold trap for collecting gas and primarily separating Ar by the virtue of temperature difference.

The syringe sampler used in the sampling unit, in a "syringe"-alike form, is made from metal or alloy tube, wherein the needlepoint part is conical with pinholes closely distributed on its surface, the end part of the syringe is sealed, and a pipeline joint is positioned near the end part of the syringe for connecting a aspirator pump.

Before sampling, the sampler is inserted underground, with the juncture of the ground therewith being shielded to prevent interfusion of ground air, or the sampler is directly used for collecting an atmospheric sample. During the sampling, the gas sample passes through a filter under the action of a compressor pump, and then through a flow meter, a dehydration column and a deaerator before entering a room temperature sampling column.

The separating-purifying unit comprises a molecular sieve collection column positioned in a liquid nitrogen cold trap for concentrating Ar and part $N_2$ as well as trace $O_2$, a preparative chromatographic system, a proportional counter for collecting $^{37}Ar$ and measuring its radioactivity, a He carrier gas source for a thermal conductivity detector of preparative chromatography, and a methane working gas source for measuring the radioactivity of $^{37}Ar$, which are connected in turn. In which the preparative chromatographic system consists of a chromatographic separation column for separating Ar and $N_2$, a room temperature catalytic deoxidizing column for eliminating trace $O_2$, a thermal conductivity detector for further purifying Ar and measuring the sum of Ar, and an activated carbon collection column for collecting chromatographic pure Ar, which are connected in turn.

The separating-purifying unit is used for the separation-purification-extraction of Ar by the virtue of gas-solid chromatographic separation principle. During the sampling, a molecular sieve collection column positioned in a liquid nitrogen cold trap is used for collecting the gas out of a low temperature sampling column, and primarily separating Ar by the virtue of temperature difference until the end of the sampling. The molecular sieve collection column is heated, and the gas desorbed by washing with a He carrier gas stream enters a preparative chromatographic system. A heavy-duty preparative chromatography and a reaction chromatography are used for fulfilling secondary separation of Ar from $O_2$ and $N_2$, and purifying, and then an activated carbon collection column is used for collecting chromatographic pure Ar; said collection column is heated, and Ar desorbed therefrom is transferred to a proportional counter.

The radioactivity measuring unit consists of a proportional counter, a shield and an electronics system.

The radioactivity measuring unit is an internal gas-filled proportional counter (i.e., proportional counting measuring equipment), wherein the background is lowered by using an anticoincidence electronic counting system and by reinforcing the shielding measures, and the detection sensitivity is increased by using energy spectrum measuring. During the whole measuring course, according to the measuring software as programmed, the measuring conditions are automatically set (for example, automatically calculate and adjust to correct operating voltage and measuring conditions according to plateau curve as measured); and the radioactivity measuring is automatically conducted accompanied with automatically correcting decay, dead time and efficiency, giving plateau length and plateau slope, and displaying the measuring results. At the end of the measurement, the operating voltage of the system is automatically lowered to zero in favor of protection of the system.

The control unit is used for monitoring and controlling the sampling unit, the separating-purifying unit and the radioactivity measuring unit by using the computer and the software.

The control unit uses the computer and the software, wherein the software has the following functions:
initializing the system;
collecting and processing the relevant sensor signals, chromatographic detector signals and radioactivity measuring information, and giving data results;
conducting on-off control on electromagnetic valves in the system; and
presetting, modifying, real-time displaying and transfinite alarming with respect to all signal parameters inputted into the sensor.

The method and equipment for separating and measuring $^{37}Ar$ quickly can meet the requirements of locales inspection for CTBT, and can also be used for separating and measuring $^{37}Ar$ quickly in other areas, which have the following features:

a. the sensitivity of measurement is high, with a measuring background of less than 0.2 $s^{-1}$, and the minimum detection concentration of $^{37}Ar$ of 50 mBq/L Ar;

b. the soil gas as treated is great, with a high production and purity of Ar; for example, when the soil gas sample as collected is 200 L, the production of Ar is 70%, and the purity is greater than 98%, wherein the content of $O_2$ is less than 0.1%.

c. the working efficiency is high, with the operation time of about 2.5 hours beginning from sampling to giving measuring results;

d. each of the units can be operated on vehicle, which is flexible; and the locales inspection on 2-3 sites can be finished each day.

4. DESCRIPTION OF FIGURES

Figure 1:
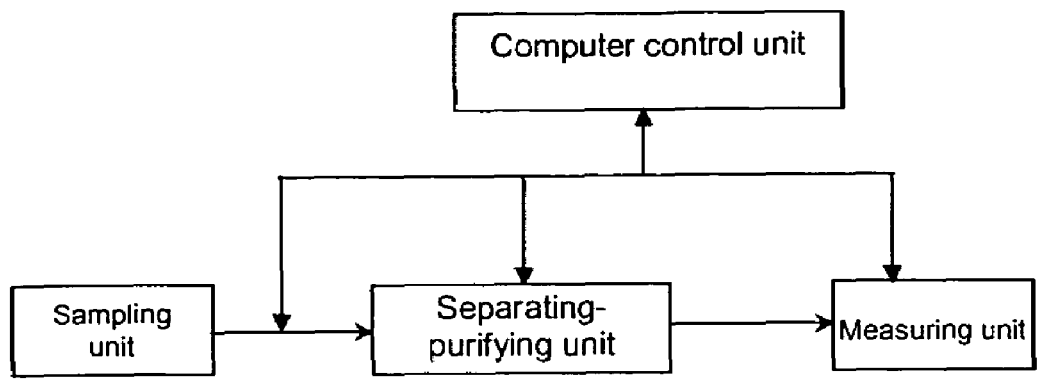
FIG. 1 is a schematic block diagram illustrating components of the system of the invention.

The figures include a syringe 31, a joint 32, a needlepoint 33, a syringe sampler 1, a filter 2, a compressor pump 3, a gas mass flow meter 4, a dehydration column 5, a deaerator 6, a sampling column 7, a molecular sieve collection column 8, a separation column 9, an activated carbon collection column 10, a proportional counter 11, a catalytic deoxidizing column 12, a vacuum pump 13, a thermal conductivity detector 14, a methane gas cylinder 15, a helium gas cylinder 16, pressure sensors 17-20, stabilizing current valves 21-22, stabilizing pressure valves 23-25, two-way electromagnetic valves S1-S4, and three-way electromagnetic valves T1-T14.

5. MODE OF CARRYING OUT THE INVENTION

In combination with the figures, the concrete embodiment procedure of the system for separating and measuring $^{37}Ar$ quickly is described in detail as follows.

As seen from FIG. 1, the system for separating and measuring $^{37}Ar$ quickly comprises a sampling unit, a separating-purifying unit, a radioactivity measuring unit and a control unit. In which, the sampling unit, the separating-purifying unit and the radioactivity measuring unit are connected in turn, whose operations, i.e., on-off controls of valves, and the set of measuring conditions in the measuring system as well as data collection and measurement are effectuated by a computer according to the software of the control unit.

Figure 2:
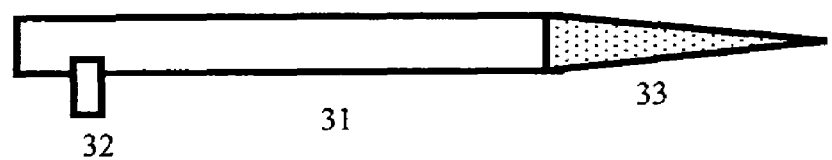
FIG. 2 is a schematic view illustrating structure of the syringe sampler used in the example of the invention.

FIG. 2 is a schematic view illustrating structure of the syringe sampler used in the example of the invention. The syringe 31 is made from stainless steel tube, having a length of 1.5 m and a diameter of 30 mm. The needlepoint 33 is 25 cm long, with pinholes closely distributed on its surface. The end part of the syringe is sealed, with a joint 32 positioned at 15 cm distant from the end part.

Figure 3:
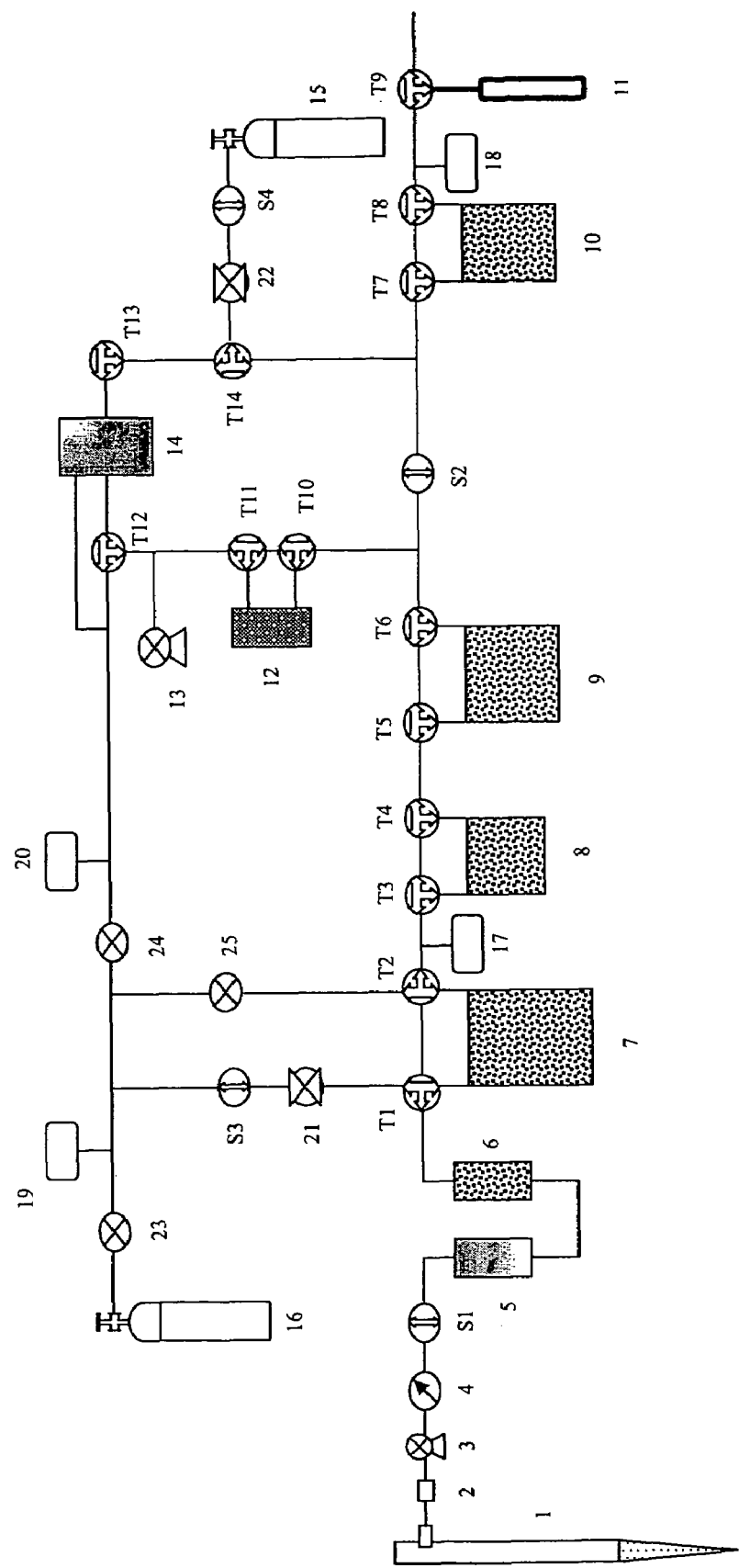
FIG. 3 is a process chart of the sampling unit and the separating-purifying unit in the example of the invention.

FIG. 3 is a process chart of the sampling unit and the separating-purifying unit in the example of the invention.

The concrete operation procedures of the invention are described as follows.

1) Preparation Stage

The vacuum pump 13 is turned on, the electromagnetic valves S1, T9, T12 and T13 are de-electrified (i.e., the electromagnetic valves are at off state, the same below), the electromagnetic valves T1-T11 are electrified (i.e., the electromagnetic values are at on state, the same below), and the system is vacuumized. The sampler 1 is inserted to a depth of 1 m underground, with the juncture of the ground therewith being shielded with a plastic film to prevent interfusion of ground air, or the sampler 1 is directly used for collecting an atmospheric sample.

2) Sampling

The vacuum pump 13 is turned off to stop vacuumizing. The compressor pump 3 is turned on, and the electromagnetic valve S1 is electrified for sampling. A gas sample passes through the filter 2 under the action of the compressor pump 3 to eliminate particles in the gas, and then through a gas mass flow meter to display the sampling amount, the room temperature dehydration column (4AM.S) 5 and the deaerator (an active rare earth metal mixture) 6 in turn before entering the molecular sieve (5AM.S) sampling column 7 positioned in a cold trap (−180° C. to −185° C.), whereby gas in the soil is adsorbed. When the pressure sensor 17 displays a pressure of 5 kPa, the electromagnetic valve T3 is de-electrified, so that the gas out of the sampling column 7 enters the molecular sieve (5AM.S) collection column 8 positioned in a liquid nitrogen cold trap. When the gas mass flow meter 4 displays a sampling amount of 200 L, the electromagnetic valve S1 is de-electrified to stop sampling.

3) Washing with a He Gas Stream

The He gas cylinder 16 is turned on, the stabilizing pressure valve 23 is adjusted thereby allowing the pressure sensor 19 to display a pressure of 460 kPa, the electromagnetic valves S3 and T1 are electrified, the stabilizing current valve 21 is adjusted, the sampling column 7 is washed with a He gas stream, and the gas enters the molecular sieve collection column 8 positioned in a liquid nitrogen cold trap. When the pressure sensor 17 displays a pressure of 100 kPa, the electromagnetic valve S3 is de-electrified to stop the washing. The electromagnetic valve T3 is electrified.

4) Preparation for Separating and Purifying

The stabilizing pressure valve 25 is adjusted, the electromagnetic valve T2 is electrified, and the electromagnetic valves T5 to T11 are de-electrified thereby allowing the He gas stream to pass through the separation column 9, the catalytic deoxidizing column (Pd catalyst) 12 and the thermal conductivity detector 14 to reach the activated carbon collection column 10. When the pressure sensor displays a pressure of 100 kPa, the electromagnetic valve T9 is electrified to discharge the He gas.

5) Separating and Purifying

The electromagnetic valves T3 and T4 are de-electrified. The collection column 8 is taken out of the liquid nitrogen cold trap, heated to 200° C., and the detached gas as carried by the He gas stream enters the separation column 9 for chromatographic separation, and the Ar gas as separated passes though the catalytic deoxidizing column 12 to eliminate trace $O_2$ before entering the thermal conductivity detector 14 for judging its chromatographic separation status. The Ar gas out of the detector 14 is collected with the activated carbon collection column 10 positioned in a liquid nitrogen cold trap.

6) Preparation for Collecting Ar Gas

The electromagnetic valves T7, T8, T10, T11 and S2 are electrified, the electromagnetic valves T9 and T14 are de-electrified, the vacuum pump 13 is turned on, and the pipeline and the proportional counter are vacuumized.

7) Collecting Ar Gas and Filling it to the Counter

The pump 13 is turned off, and the electromagnetic valves T7, T8 and S2 are de-electrified. The activated carbon collection column 10 is taken out of the liquid nitrogen cold trap, and heated with the gas desorbed being collected in the proportional counter 11. The methane gas cylinder 15 is turned on, the electromagnetic valve S4 is electrified, and the stabilizing current valve 22 is adjusted thereby allowing the methane gas to pass through the activated carbon column 10 before filling it into the proportional counter in a ratio of $Ar/CH_4=9:1$ according to the pressure display of the pressure sensor 18.

At the end of the sampling and the separating-purifying process, the system is switched off.

8) Measuring Radioactivity

The proportional counter 11 is placed in a shielded enclosure for radioactivity measurement. At the time of measuring, the internal gas-filled proportional counter is turned on, and the proportional counter is placed in a shielded enclosure. The measuring software is started for measuring plateau curve, and automatically plotting a plateau curve, and giving plateau length and plateau slope. According to the plateau curve as measured, the system makes an automatic calculation and adjusts the operation voltage to a desired value, whereby measuring the activity of $^{37}Ar$ and giving the measuring results.

The present invention can also be used for separating-purifying and activity measuring of $^{37}Ar$ in the atmosphere of local areas, and used in other areas that require separating and measuring $^{37}Ar$ quickly.

The invention claimed is:

1. A method for separating and measuring $^{37}Ar$ from a soil gas sample or an atmospheric sample, which comprises the following steps in turn:
   1) sampling, which comprises collecting soil gas sample or directly collecting atmospheric air with a syringe sampler;
   2) eliminating impurities, which comprises passing the gas sample as collected through a room temperature molecular sieve column to eliminate $H_2O$ and $CO_2$, and through a room temperature deaerator to eliminate $O_2$;
   3) separating, which comprises allowing the gas sample after eliminating impurities to be adsorbed by entering a sampling column positioned in a cold trap at a temperature from −170° C. to −185° C., and then washing the sampling column with a He gas stream, whereby a majority of Ar and partial $O_2$ and $N_2$ at the front end of the sampling column are carried by the He gas stream to enter a molecular sieve collection column in a liquid nitrogen cold trap;
   4) purifying, which comprises taking the collection column out of the cold trap, and washing it with a He carrier gas stream after heating, whereby Ar, $O_2$ and $N_2$ are detached from the collection column before entering a separation column in a chromatographic system at a temperature from −20° C. to −70° C. for chromatographic separation; allowing the gas after separation to enter a room temperature catalytic deoxidizing column, whereby eliminating trace $O_2$ that is inseparable from Ar and further purifying Ar; then, allowing the gas after purification to be analyzed by entering a thermal conductivity detector;

5) measuring the sum of Ar, which comprises measuring the sum of Ar as collected with the thermal conductivity detector;

6) collecting Ar, which comprises collecting Ar in tail gas out of the thermal conductivity detector with an activated carbon collection column positioned in a liquid nitrogen cold trap heating the activated carbon collection column, and collecting Ar gas as desorbed with a proportional counter; and 7) measuring the activity of $^{37}$Ar, which comprises filling the proportional counter with a working gas methane in a ratio of $Ar/CH_4=9:1$, and measuring the activity of radioactive $^{37}$Ar after thoroughly mixing the two gases.

2. A system for separating and measuring $^{37}$Ar used in the method according to claim 1, which comprises a sampling unit for sampling the gas to be measured; a separating-purifying unit for separating-purifying-extracting the gas to be measured and for measuring the production of Ar; a measuring unit for measuring the radioactivity of $^{37}$Ar gas as extracted; and a control unit for controlling the working process of the above three units by using a computer and a software; wherein, the sampling unit, the separating-purifying unit, and the radioactivity measuring unit are connected in turn, and the control unit connects to and causes operation of the sampling unit, the separating-purifying unit, and the radioactivity measuring unit to carry out the steps set forth in claim 1.

3. The system for separating and measuring $^{37}$Ar according to claim 2, characterized in that the sampling unit comprises a syringe sampler (1) for collecting soil gas, a room temperature molecular sieve dehydration column (5) for eliminating $H_2O$ and $CO_2$, a room temperature deaerator (6) for eliminating $O_2$ from the collected gas, and a sampling column (7) positioned in a low temperature cold trap for collecting gas and primarily separating Ar by the virtue of temperature difference.

4. The system for separating and measuring $^{37}$Ar according to claim 3, characterized in that the syringe sampler (1) is made from metal or alloy tube, wherein a needlepoint part is conical with pinholes closely distributed on a surface of the needlepoint part, an end part of the syringe sampler is sealed, and a pipeline joint is positioned near the end part of the syringe sampler for connecting an aspirator pump.

5. The system for separating and measuring $^{37}$Ar according to claim 4, characterized in that the separating-purifying unit comprises a molecular sieve collection column (8) positioned in a liquid nitrogen cold trap for concentrating Ar and part $N_2$ as well as trace $O_2$, a preparative chromatographic system, a proportional counter (11) for collecting $^{37}$Ar and measuring its radioactivity, a He carrier gas source (16) for a thermal conductivity detector of preparative chromatography, and a methane working gas source (15) for measuring the radioactivity of $^{37}$Ar, which are connected in turn; wherein, the preparative chromatographic system consists of a chromatographic separation column (9) for separating Ar and $N_2$, a room temperature catalytic deoxidizing column (12) for eliminating trace $O_2$, a thermal conductivity detector (14) for further purifying Ar and measuring the sum of Ar, and an activated carbon collection column (10) for collecting chromatographic pure Ar, which are connected in turn.

6. The system for separating and measuring $^{37}$Ar according to claim 5, characterized in that the radioactivity measuring unit consists of a proportional counter, a shield and an electronics system.

7. The system for separating and measuring $^{37}$Ar according to claim 6, characterized in that the control unit uses the computer and the software, wherein the software has the following functions:

initializing the system;

collecting and processing relevant sensor signals, chromatographic detector signals and radioactivity measuring information, and giving data results;

conducting on-off control on electromagnetic valves in the system; and presetting, modifying, real-time displaying and transfinite alarming with respect to all signal parameters inputted into a sensor.

8. The system for separating and measuring $^{37}$Ar according to claim 5, characterized in that the control unit uses the computer and the software, wherein the software has the following functions:

initializing the system;

collecting and processing relevant sensor signals, chromatographic detector signals and radioactivity measuring information, and giving data results;

conducting on-off control on electromagnetic valves in the system; and presetting, modifying, real-time displaying and transfinite alarming with respect to all signal parameters inputted into a sensor.

9. The system for separating and measuring $^{37}$Ar according to claim 4, characterized in that the radioactivity measuring unit consists of a proportional counter, a shield and an electronics system.

10. The system for separating and measuring $^{37}$Ar according to claim 9, characterized in that the control unit uses the computer and the software, wherein the software has the following functions:

initializing the system;

collecting and processing relevant sensor signals, chromatographic detector signals and radioactivity measuring information, and giving data results;

conducting on-off control on electromagnetic valves in the system; and presetting, modifying, real-time displaying and transfinite alarming with respect to all signal parameters inputted into a sensor.

11. The system for separating and measuring $^{37}$Ar according to claim 4, characterized in that the control unit uses the computer and the software, wherein the software has the following functions:

initializing the system;

collecting and processing relevant sensor signals, chromatographic detector signals and radioactivity measuring information, and giving data results;

conducting on-off control on electromagnetic valves in the system; and presetting, modifying, real-time displaying and transfinite alarming with respect to all signal parameters inputted into a sensor.

12. The system for separating and measuring $^{37}$Ar according to claim 3, characterized in that the separating-purifying unit comprises a molecular sieve collection column (8) positioned in a liquid nitrogen cold trap for concentrating Ar and part $N_2$ as well as trace $O_2$, a preparative chromatographic system, a proportional counter (11) for collecting $^{37}$Ar and measuring its radioactivity, a He carrier gas source (16) for a thermal conductivity detector of preparative chromatography, and a methane working gas source (15) for measuring the radioactivity of $^{37}$Ar, which are connected in turn; wherein, the preparative chromatographic system consists of a chromatographic separation column (9) for separating Ar and $N_2$, a room temperature catalytic deoxidizing column (12) for eliminating trace $O_2$, a thermal conductivity detector (14) for further purifying Ar and measuring the sum of Ar, and an activated carbon collection column (10) for collecting chromatographic pure Ar, which are connected in turn.

13. The system for separating and measuring $^{37}$Ar according to claim 12, characterized in that the radioactivity measuring unit consists of a proportional counter, a shield and an electronics system.

14. The system for separating and measuring $^{37}$Ar according to claim 13, characterized in that the control unit uses the computer and the software, wherein the software has the following functions:
   initializing the system;
   collecting and processing relevant sensor signals, chromatographic detector signals and radioactivity measuring information, and giving data results;
   conducting on-off control on electromagnetic valves in the system; and
   presetting, modifying, real-time displaying and transfinite alarming with respect to all signal parameters inputted into a sensor.

15. The system for separating and measuring $^{37}$Ar according to claim 12, characterized in that the control unit uses the computer and the software, wherein the software has the following functions:
   initializing the system;
   collecting and processing relevant sensor signals, chromatographic detector signals and radioactivity measuring information, and giving data results;
   conducting on-off control on electromagnetic valves in the system; and
   presetting, modifying, real-time displaying and transfinite alarming with respect to all signal parameters inputted into a sensor.

16. The system for separating and measuring $^{37}$Ar according to claim 3, characterized in that the radioactivity measuring unit consists of a proportional counter, a shield and an electronics system.

17. The system for separating and measuring $^{37}$Ar according to claim 16, characterized in that the control unit uses the computer and the software, wherein the software has the following functions:
   initializing the system;
   collecting and processing relevant sensor signals, chromatographic detector signals and radioactivity measuring information, and giving data results;
   conducting on-off control on electromagnetic valves in the system; and
   presetting, modifying, real-time displaying and transfinite alarming with respect to all signal parameters inputted into a sensor.

18. The system for separating and measuring $^{37}$Ar according to claim 3, characterized in that the control unit uses the computer and the software, wherein the software has the following functions:
   initializing the system;
   collecting and processing relevant sensor signals, chromatographic detector signals and radioactivity measuring information, and giving data results;
   conducting on-off control on electromagnetic valves in the system; and
   presetting, modifying, real-time displaying and transfinite alarming with respect to all signal parameters inputted into a sensor.

19. The system for separating and measuring $^{37}$Ar according to claim 2, characterized in that the separating-purifying unit comprises a molecular sieve collection column (8) positioned in a liquid nitrogen cold trap for concentrating Ar and part $N_2$ as well as trace $O_2$, a preparative chromatographic system, a proportional counter (11) for collecting $^{37}$Ar and measuring its radioactivity, a He carrier gas source (16) for a thermal conductivity detector of preparative chromatography, and a methane working gas source (15) for measuring the radioactivity of $^{37}$Ar, which are connected in turn; wherein, the preparative chromatographic system consists of a chromatographic separation column (9) for separating Ar and $N_2$, a room temperature catalytic deoxidizing column (12) for eliminating trace $O_2$, a thermal conductivity detector (14) for further purifying Ar and measuring the sum of Ar, and an activated carbon collection column (10) for collecting chromatographic pure Ar, which are connected in turn.

20. The system for separating and measuring $^{37}$Ar according to claim 19, characterized in that the radioactivity measuring unit consists of a proportional counter, a shield and an electronics system.

21. The system for separating and measuring $^{37}$Ar according to claim 20, characterized in that the control unit uses the computer and the software, wherein the software has the following functions:
   initializing the system;
   collecting and processing relevant sensor signals, chromatographic detector signals and radioactivity measuring information, and giving data results;
   conducting on-off control on electromagnetic valves in the system; and
   presetting, modifying, real-time displaying and transfinite alarming with respect to all signal parameters inputted into a sensor.

22. The system for separating and measuring $^{37}$Ar according to claim 19, characterized in that the control unit uses the computer and the software, wherein the software has the following functions:
   initializing the system;
   collecting and processing relevant sensor signals, chromatographic detector signals and radioactivity measuring information, and giving data results;
   conducting on-off control on electromagnetic valves in the system; and
   presetting, modifying, real-time displaying and transfinite alarming with respect to all signal parameters inputted into a sensor.

23. The system for separating and measuring $^{37}$Ar according to claim 2, characterized in that the radioactivity measuring unit consists of a proportional counter, a shield and an electronics system.

24. The system for separating and measuring $^{37}$Ar according to claim 23, characterized in that the control unit uses the computer and the software, wherein the software has the following functions:
   initializing the system;
   collecting and processing relevant sensor signals, chromatographic detector signals and radioactivity measuring information, and giving data results;
   conducting on-off control on electromagnetic valves in the system; and
   presetting, modifying, real-time displaying and transfinite alarming with respect to all signal parameters inputted into a sensor.

25. The system for separating and measuring $^{37}$Ar according to claim 2, characterized in that the control unit uses the computer and the software, wherein the software has the following functions:
   initializing the system;
   collecting and processing relevant sensor signals, chromatographic detector signals and radioactivity measuring information, and giving data results;
   conducting on-off control on electromagnetic valves in the system; and
   presetting, modifying, real-time displaying and transfinite alarming with respect to all signal parameters inputted into a sensor.

* * * * *